United States Patent
Gretz (10) Patent No.: US 7,528,322 B1
(45) Date of Patent: May 5, 2009

(54) ADJUSTABLE ELECTRICAL BOX AND FLANGE MEMBER FOR INSTALLATION ON A BRICK OR STONE WALL

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 12/005,948

(22) Filed: Dec. 28, 2007

(51) Int. Cl.
*H01H 9/02* (2006.01)

(52) U.S. Cl. .......................... 174/57; 174/481; 174/53; 174/58; 220/3.2; 220/3.3; 248/906

(58) Field of Classification Search .................. 174/480, 174/481, 50, 53, 57, 58, 559, 61, 63; 220/3.2–3.9, 220/4.02; 248/906, 343
See application file for complete search history.

(56) References Cited

U.S. PATENT DOCUMENTS

| | | |
|---|---|---|
| 4,747,506 A | 5/1988 | Stuchlik, III |
| 5,012,043 A | 4/1991 | Seymour |
| 5,326,060 A * | 7/1994 | Chubb et al. ................. 248/906 |
| 5,598,670 A * | 2/1997 | Humphrey et al. ............ 174/53 |
| 6,359,220 B2 * | 3/2002 | Schiedegger et al. .......... 174/50 |
| 6,484,979 B1 | 11/2002 | Medlin, Jr. |
| 6,875,922 B1 | 4/2005 | Petak et al. |
| 7,087,837 B1 | 8/2006 | Gretz |
| 7,301,099 B1 * | 11/2007 | Korcz ........................... 174/58 |
| 7,358,440 B1 * | 4/2008 | Funk et al. ..................... 174/58 |
| 7,402,748 B1 * | 7/2008 | Gretz ............................ 174/58 |

* cited by examiner

*Primary Examiner*—Angel R Estrada (57) ABSTRACT

An adjustable electrical box assembly for providing electrical service on a brick or stone wall. The assembly includes a flange member, box member, and a faceplate. The flange member includes a flange and a forward extending collar. The electrical box includes sidewalls that are telescopically received in the collar of the flange member and a fastening arrangement for securing the electrical box to the flange member. After installing an electrical fixture within the electrical box, a faceplate is secured to the front of the box member.

19 Claims, 8 Drawing Sheets

ADJUSTABLE ELECTRICAL BOX AND FLANGE MEMBER FOR INSTALLATION ON A BRICK OR STONE WALL

FIELD OF THE INVENTION

This invention relates to electrical junction boxes and specifically to an adjustable electrical box assembly that enables mounting an electrical fixture to a brick or stone wall.

BACKGROUND OF THE INVENTION

Conventional electrical boxes are commonly used when installing electrical fixtures on a brick or stone building. During building construction, the conventional electrical box is mounted to the substrate with screws, nails, or similar fasteners. For a successful installation, the sidewalls of the conventional electrical box must extend through the brick or stone.

Brick and stone however are provided in a range of thicknesses, which makes it difficult to use a conventional electrical box. The conventional electrical box, having sidewalls of a fixed length, may not be long enough to extend from the substrate through the brick or stone layer. As a result, conventional electrical boxes may not be appropriate for buildings constructed of wide bricks or stones. The conventional electrical box could be mortared into a hole in the brick or stone wall, but this typically creates an unsightly area of mortar around the electrical box.

What is needed therefore is an electrical box for brick or stone walls that can be adjusted for use with brick or stone of any width. The electrical box should be capable of being mounted flush with the outer surface of the brick or stone wall regardless of the thickness of the bricks or stones. The electrical box should also be capable of providing an aesthetically pleasing installation.

SUMMARY OF THE INVENTION

The invention is an adjustable electrical box assembly for providing electrical service on a brick or stone wall. The assembly includes a flange member, box member, and a faceplate. The flange member includes a flange and a forward extending collar. The electrical box includes sidewalls that are telescopically received in the collar of the flange member and a fastening arrangement for securing the electrical box to the flange member. After installing an electrical fixture within the electrical box, a faceplate is secured to the front of the box member.

OBJECTS AND ADVANTAGES

Several advantages are achieved with the adjustable electrical box assembly of the present invention, including:

(1) The adjustable electrical box assembly of the present invention enables the mounting of electrical fixtures on a brick or stone wall having a wide range of thicknesses.

(2) The adjustable electrical box assembly of the present invention eliminates the necessity of using mortar to secure an electrical box to a brick or stone wall.

(3) The elimination of the use of mortar in the present invention simplifies and reduces the time involved in securing an electrical fixture to a brick or stone wall.

(4) A flange member with a collar and electrical box shaped and sized to fit within the collar enables the electrical box to be adjustable with respect to the wall surface.

(5) The adjustable electrical box assembly includes a faceplate for providing an aesthetically pleasing front that obscures sight of the front perimeter of the electrical box.

These and other objects and advantages of the present invention will be better understood by reading the following description along with reference to the drawings.

Table of Nomenclature

The following is a listing of part numbers used in the drawings along with a brief description:

| Part Number | Description |
| --- | --- |
| 20 | adjustable electrical box assembly |
| 22 | flange member |
| 24 | electrical box |
| 26 | faceplate |
| 28 | flange |
| 30 | collar |
| 32 | sidewalls of the electrical box |
| 34 | front edge of electrical box sidewalls |
| 36 | rear edge of electrical box sidewalls |
| 38 | front panel |
| 40 | boss |
| 42 | inner surface of sidewalls |
| 44 | front face of boss |
| 46 | inner aperture in boss |
| 48 | outer aperture in boss |
| 50 | dividing wall |
| 52 | knockout panel |
| 54 | outer surface of sidewalls |
| 56 | aperture in sidewalls |
| 56A | corresponding apertures in each row |
| 58 | row of apertures |
| 60 | plane bisecting sidewalls of electrical box |
| 61 | wiring enclosure |
| 62 | front surface of flange member |
| 64 | slot in flange member |
| 66 | aperture in flange member |
| 67 | fillet |

-continued

| Part Number | Description |
| --- | --- |
| 68 | central opening in flange member |
| 70 | periphery of central opening |
| 72 | back surface of flange |
| 73 | slots in collar of flange member |
| 74 | opening in faceplate |
| 76 | arm |
| 78 | inner slot |
| 80 | outer slot |
| 82 | chamfered edge |
| 84 | outer periphery of front panel |
| 86 | outer surface of front panel |
| 88 | brick wall |
| 90 | substrate |
| 92 | fastener |
| 94 | hole in substrate |
| 96 | open area in brick wall |
| 98 | base of collar |
| 100 | outer surface of brick wall |
| 102 | fastener |
| 104 | cover plate |
| 106 | fastener |
| 108 | caulk or duct seal |
| 110 | light fixture |
| D1 | outer diameter of sidewalls of electrical box |
| D2 | inner diameter of collar and central opening |
| D3 | distance collar extends from front surface of flange |
| D4 | length of electrical box sidewalls |

DETAILED DESCRIPTION OF THE INVENTION

Figure 1:
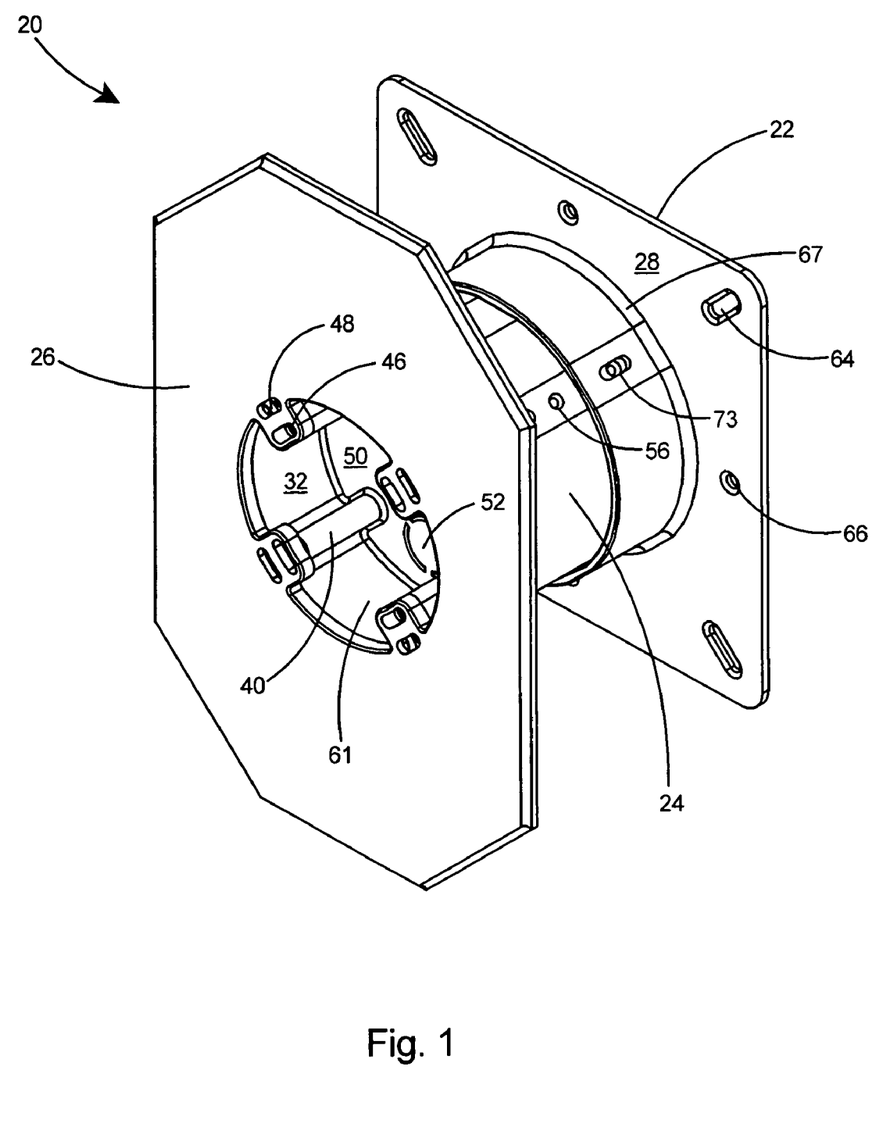
FIG. 1 is a perspective view of a preferred embodiment of an adjustable electrical box assembly according to the present invention.

With reference to the preferred embodiment of FIG. 1, the present invention is an adjustable electrical box assembly 20 including a flange member 22, an electrical box 24, and a faceplate 26. The adjustable electrical box assembly 20 simplifies the process of installing an electrical fixture on a brick or stone wall. Bricks and stones are supplied in various widths or thicknesses and the adjustable electrical box assembly of the present invention enables an installer to rapidly adjust the assembly 20 to accommodate bricks or stones of a wide variety of thicknesses.

Figure 2:
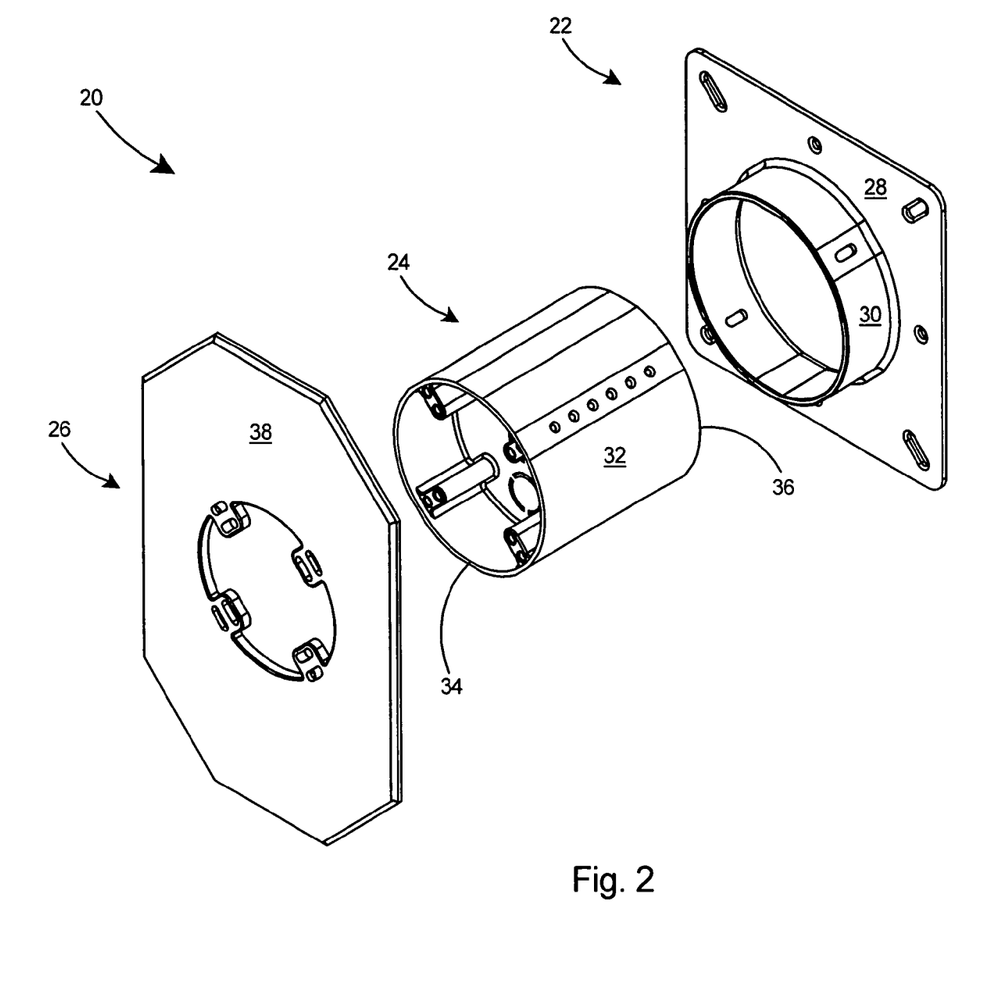
FIG. 2 is an exploded perspective view of the adjustable electrical box assembly of FIG. 1.

Referring to FIG. 2, the flange member 22 includes a flange 28 and a forward extending collar 30. The electrical box 24 includes sidewalls 32 having a front edge 34 and a rear edge 36. The sidewalls 32 of the electrical box 24 are telescopically received in the collar 30 of the flange member 22. The faceplate 26 portion of the adjustable electrical box assembly 20 includes a front panel 38 that is secured at the front edge 34 of the electrical box sidewalls 32.

Figure 3:
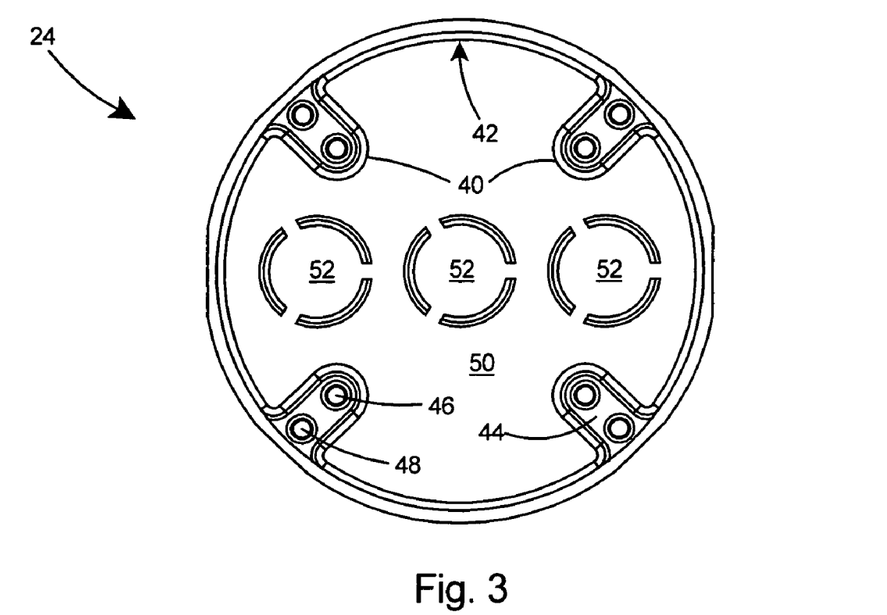
FIG. 3 is a front elevation view of the electrical box that forms a portion of the adjustable electrical box assembly of FIG. 2.
Figure 4:
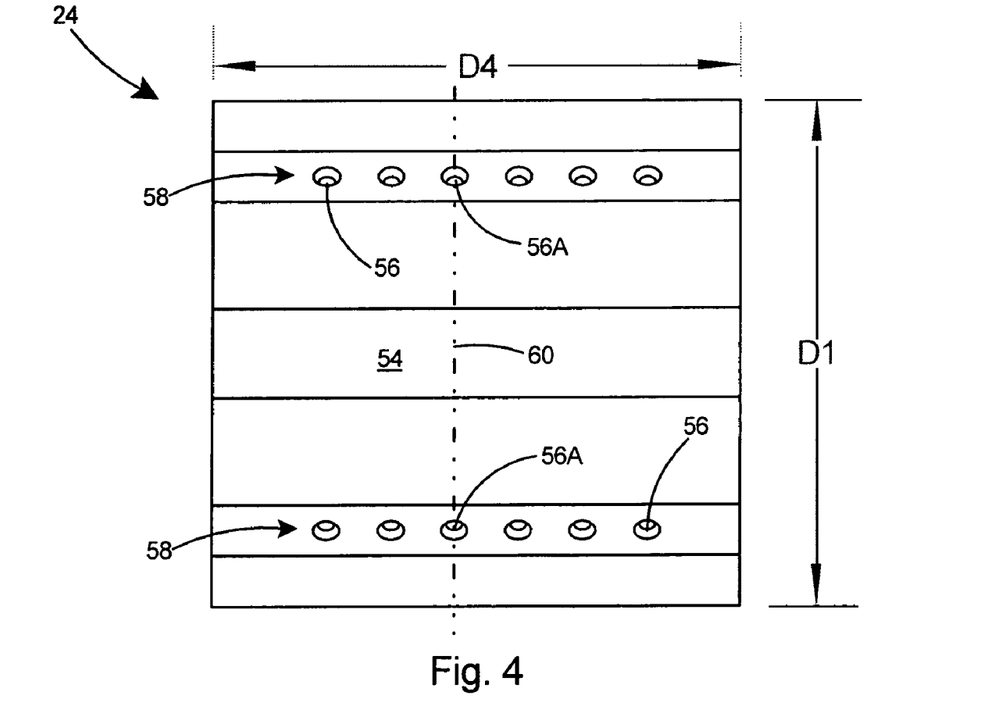
FIG. 4 is a side view of the electrical box of FIG. 3.

With reference to FIGS. 3 and 4, the electrical box 24 includes four inward extending bosses 40 integral with and projecting from the inner surface 42 of the sidewalls 32. The integral bosses 40 each include a front face 44, inner apertures 46, and outer apertures 48 therein. The electrical box 24 includes a dividing wall 50 with removable knockout panels 52 therein. As shown in FIG. 4, the outer surface 54 of the sidewalls 32 include a plurality of apertures 56 therein, with the apertures 56 extending into the bosses 40 of the electrical box 24. Four rows 58 of the apertures 56 are provided extending longitudinally in a line along the sidewalls 32 of the electrical box 24. Each aperture 56 in a given row 58 of apertures, such as apertures 56A in FIG. 4, is in alignment with a corresponding aperture 56A in each of the other rows 58. Each of the corresponding apertures 56A is aligned along a plane 60 bisecting the sidewalls 32 of the electrical box 24 and parallel with the edges 34, 36 of the electrical box 24. The outer diameter D1 of the sidewalls 32 is preferably between 3.98 and 3.99 inches and the length, a distance D4 in FIG. 4, of the sidewalls 32 is preferably at least 3.5 inches. A wiring enclosure 61 is provided at the front end of the electrical box 24 defined by the sidewalls 32 and the dividing wall 50. The front faces 44 of the bosses are recessed a slight distance from the front edge 34 of the electrical box 24. The electrical box 24 is substantially tubular shaped and includes a circular outer periphery as shown in FIG. 3. Other shapes are possible for the electrical box 24 such as square, hexagonal, or octagonal as long as the shape of the collar 30 (see FIG. 2) of the flange member 22 were changed to coincide with the shape of the electrical box 24. Preferably, the electrical box 24 includes four of the inward extending bosses 40 and the bosses are preferably spaced equidistant around the inner periphery of the electrical box 22.

Figure 5:
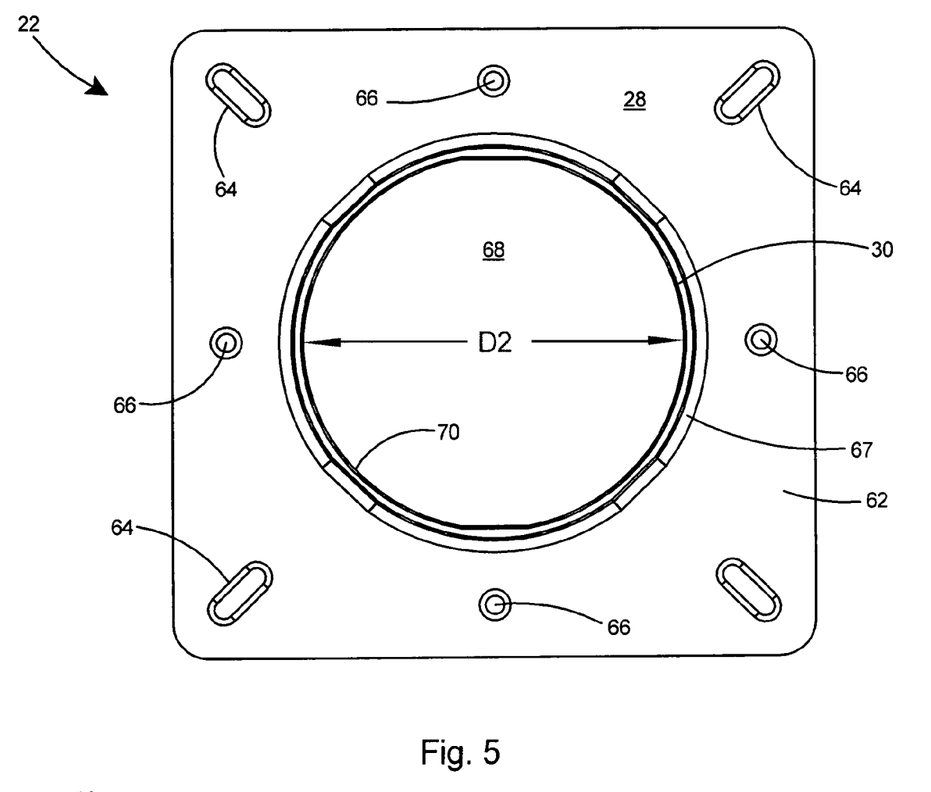
FIG. 5 is a front view of the flange member that forms a portion of the adjustable electrical box assembly of FIG. 2.
Figure 6:
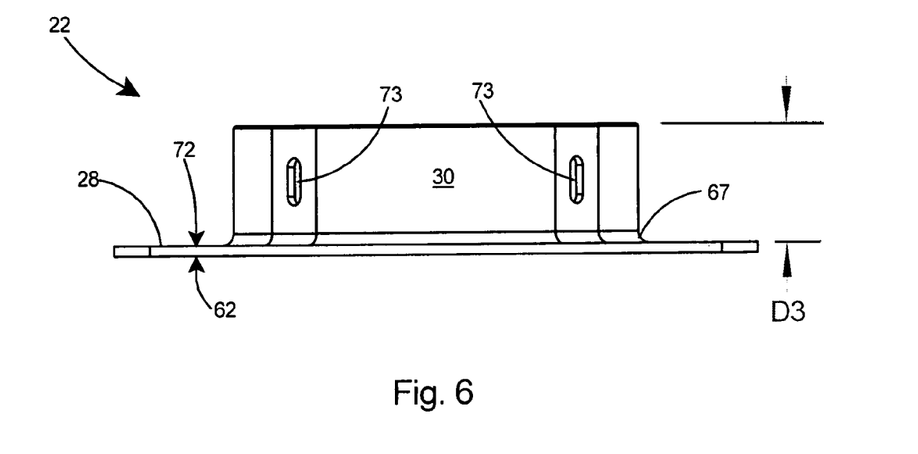
FIG. 6 is a side view of the flange member of FIG. 5.

Referring to FIGS. 5 and 6, the flange member 22 includes a front surface 62 and a plurality of slots 64 and apertures 66 therein. A fillet 67 extends between the collar 30 and the flange 28. The fillet 67 is provided around the entire outer periphery of the collar 30 and serves as a reinforcing strip that strengthens and reinforces the corner where the collar 30 and flange 28 meet. In a preferred embodiment of the flange member 22, the flange member 22 is molded in one piece of plastic and the fillet is formed in the molding operation. The flange member 22 includes a central opening 68 and a back surface 72 with the collar 30 extending forward from the periphery 70 of the central opening 68. The inner diameter D2 of the collar 30 and central opening 68 is preferably between 3.995 and 4.005 inches. Preferably, collar 30 extends by distance D3 from the front surface 62 of the flange 28 by at least 1.26 inches. Collar 30 further includes a plurality of slots 73 spaced around its periphery as shown in FIG. 6. Preferably the collar 30 of the flange member 22 includes four slots 73 spaced equidistant around the periphery of the collar 30.

Figure 7:
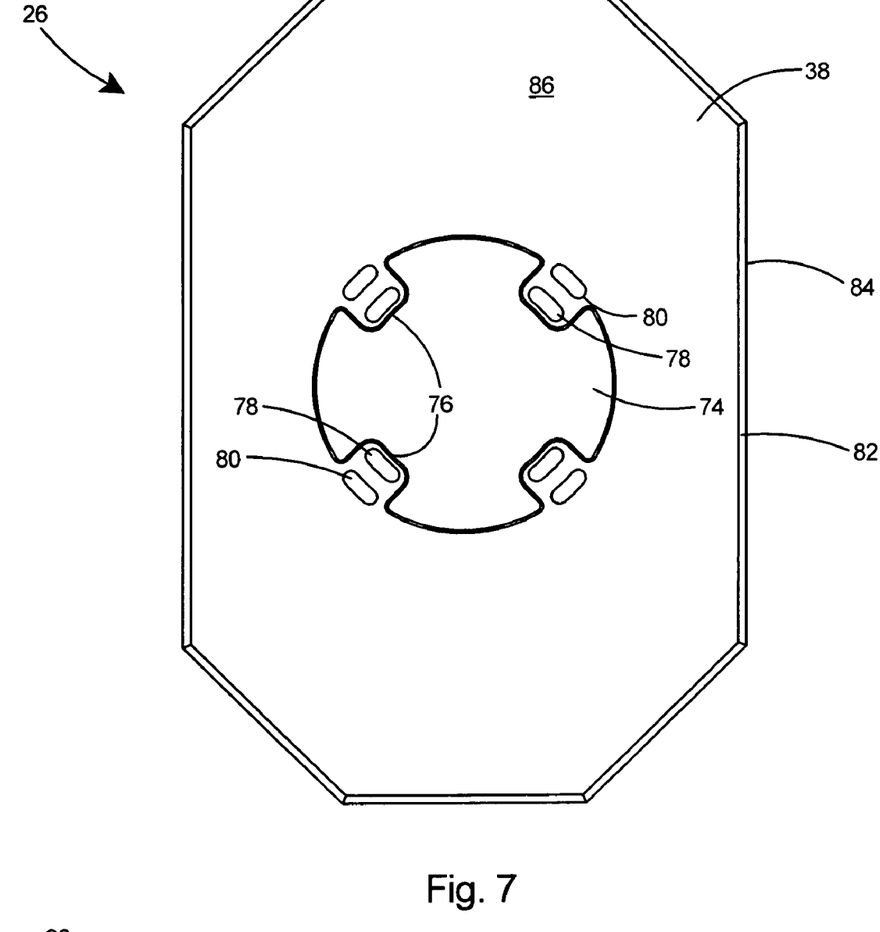
FIG. 7 is a front elevation view of the faceplate that forms a portion of the adjustable electrical box assembly of FIG. 2.
Figure 8:
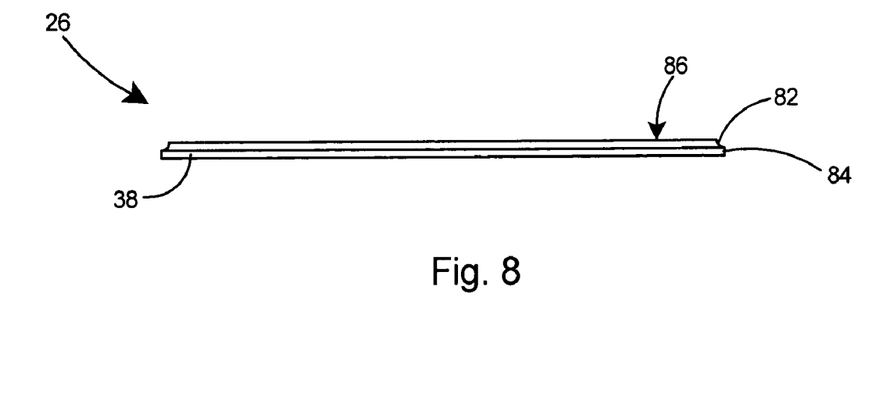
FIG. 8 is a side view of the faceplate of FIG. 7.

With reference to FIGS. 7 and 8 there is shown the faceplate 26 portion of the electrical box assembly of the present invention. The front panel 38 portion of the faceplate 26 includes an opening 74 and four arms 76 extending into the opening 74. Each arm includes an inner slot 78 and an outer slot 80. A chamfered edge 82 is included along the outer periphery 84 of the outer surface 86 of the front panel 38. The arms 76 extend the entire length of the electrical box sidewalls 32.

Figure 9:
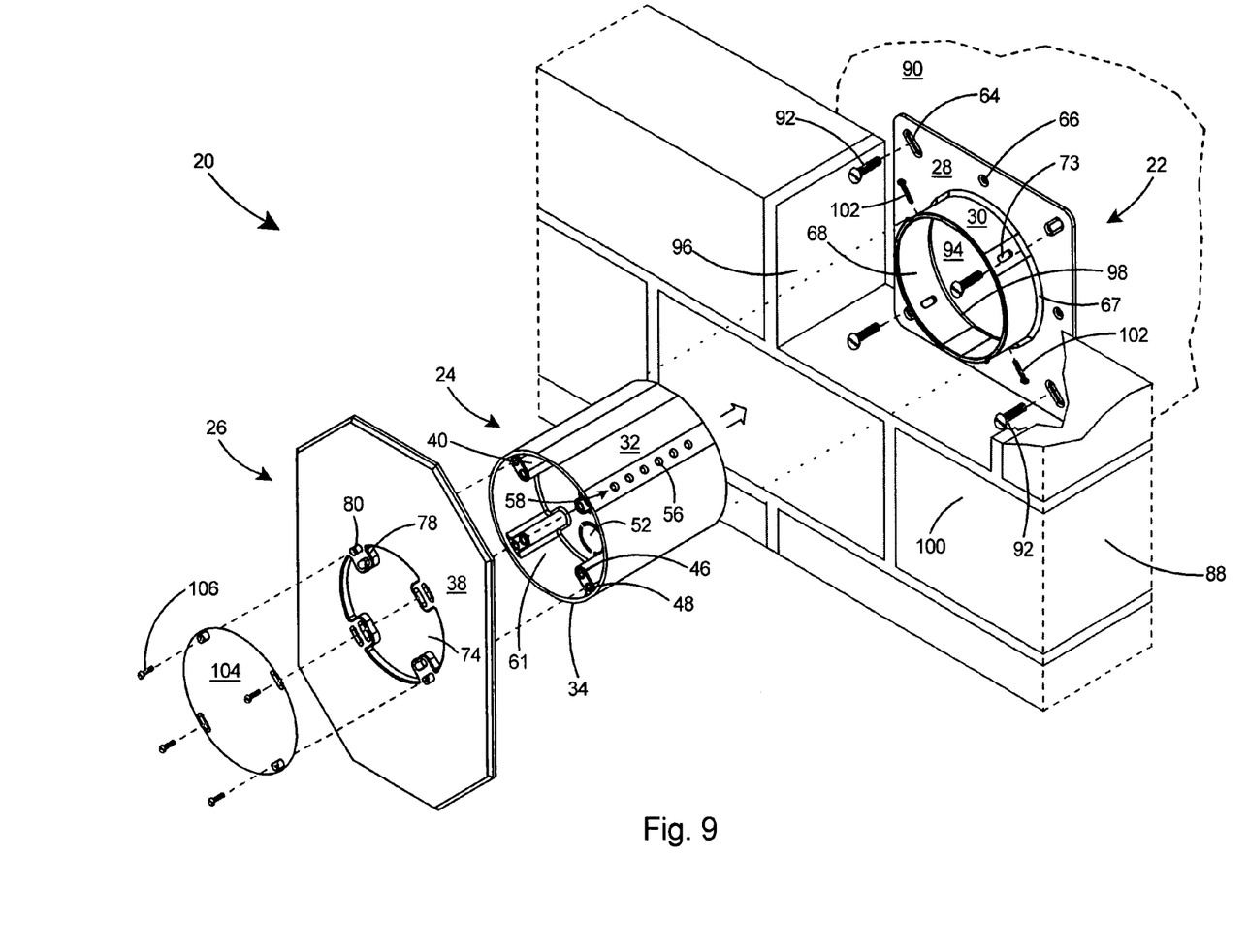
FIG. 9 is an exploded perspective view of an adjustable electrical box assembly according to the present invention in alignment with a brick wall to be secured thereto.

The reader is referred to FIG. 9 for an explanation of the operation of the present invention. FIG. 9 depicts an exploded perspective view of an adjustable electrical box assembly 20 according to the present invention in alignment with a brick wall 88 to which it will be secured. In operation, the adjustable electrical box assembly 20 is typically used to mount an electrical fixture, such as a lighting fixture (not shown), to a brick or stone wall of a building. As the stone or brick wall 88 is being constructed, the installer marks the desired location for the electrical box assembly 20 and mounts the flange member 22 to the substrate 90, which is typically a material such as plywood, with fasteners 92 through the slots 64 or apertures 66 in the flange 28 of the flange member 22. Prior to mounting the flange member 22, a hole 94 may be cut in the substrate 90 in alignment with the central opening 68 of the flange member 22. Hole 94 would preferably be made at least as large as the central opening 68. As the layers of brick in the brick wall 88 are completed, an open area 96 is left in the brick wall 88 directly in front of the flange member 22 that is large enough to accommodate the electrical box 24. After being secured to the substrate 90, the collar 30 portion of the flange member 22 typically extends some portion of the way through the brick wall 88. With the flange member 22 secured to the substrate 90 and hole 94 created at the base 98 of the collar 30, electrical box 24 is then advanced into the collar 30. Electrical box 24, which is telescopically received in the collar 30 of the flange member 22, is advanced into the collar 30 until the front edge 34 of the electrical box sidewalls 32 is substantially flush with the outer surface 100 of the brick wall 88. Preferably, each of the rows of apertures 58 in the electrical box 24 are in alignment with one of the slots 73 in the flange member 22 when the electrical box 24 is telescopically received in the collar 30 of the flange member 22. After the electrical box 24 is properly seated at the desired depth within the collar 30, fasteners 102 are driven through slots 73 in collar 30 and into the apertures 56 in the sidewalls 32 of the electrical box 24 to secure the electrical box 24 to the flange member 22 and thus secure the electrical box assembly 20 to the building. Mortar (not shown) can then be inserted between the electrical box 24 and the brick wall 88 to seal the open area between the electrical box 24 and the brick wall 88. After the mortar dries, caulk or duct seal can be applied to seal any remaining cracks. Duct seal is available from Gardner Bender of Milwaukee, Wis. An electrical fixture (not shown) may then be installed in the wiring enclosure 61 of the electrical box 24 and the electrical terminations completed, after which the faceplate 26 is secured to the electrical box 24. The faceplate 26 obscures the area immediately around the sidewalls 32 of the electrical box 24 from view and thereby makes the finished electrical box assembly 20 aesthetically pleasing to view. A cover plate 104 may then be secured to the faceplate with fasteners 106 to close the faceplate opening 74. Any conventional cover plate 104 may be secured to the faceplate 26 as the cover plate 104 is typically specific to the type of electrical fixture installed within he electrical box 24.

Figure 10:
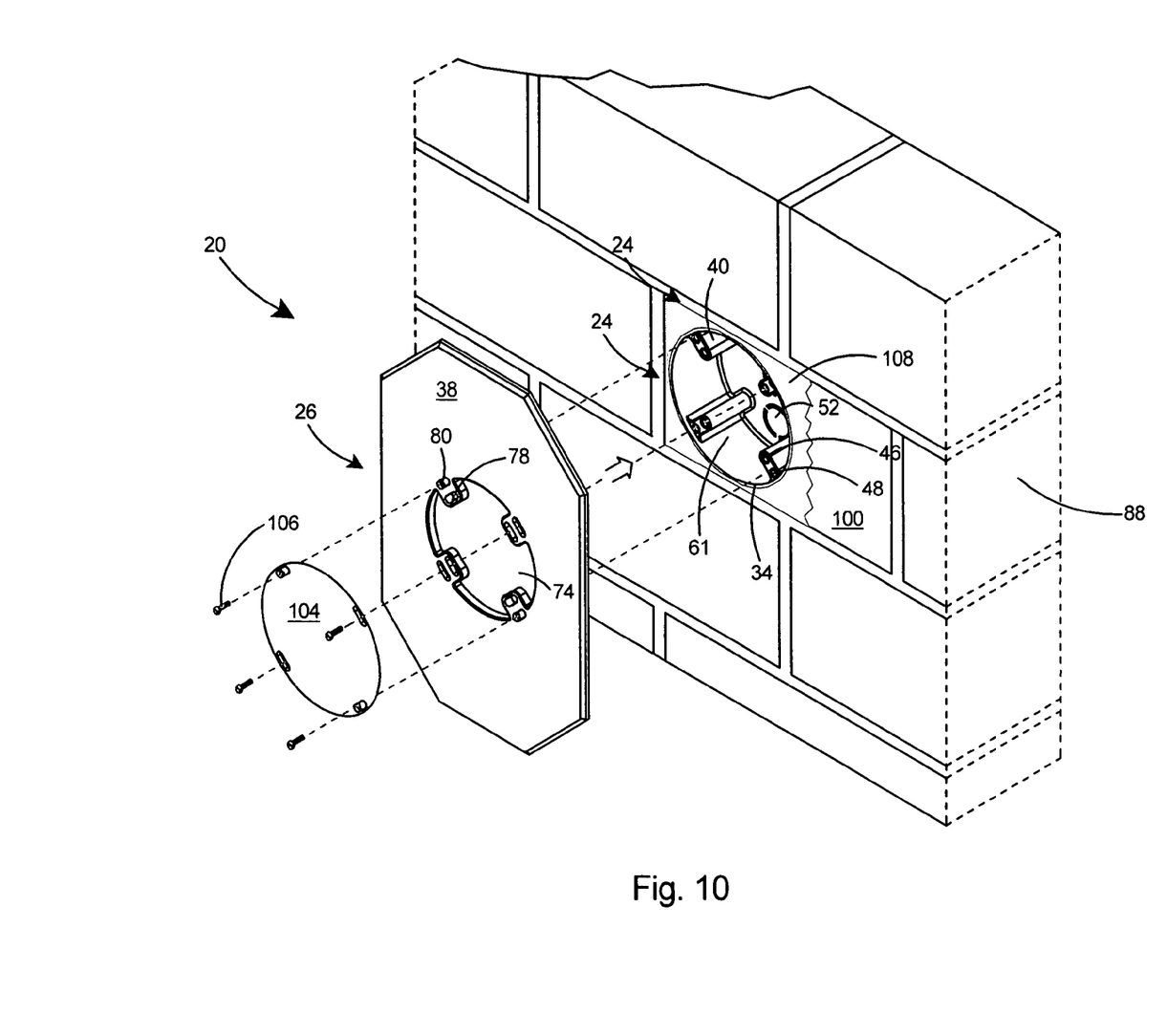
FIG. 10 is a perspective view similar to FIG. 9 but after the electrical box portion of the adjustable electrical box assembly has been secured within the brick wall.

With reference to FIG. 10 there is shown an adjustable electrical box assembly 20 according to the present invention in which the electrical box 24 has been mounted substantially flush with the outer surface 100 of the brick wall 88. Although the drawings herein show a flush mounting of the electrical box 24, it should be understood that the electrical box 24 could also be mounted with the front edge extending outward from the wall to give the electrical box assembly a more attractive three-dimensional appearance. The opening around the electrical box 24 has been filled with caulk 108 to seal against air infiltration.

Figure 11:
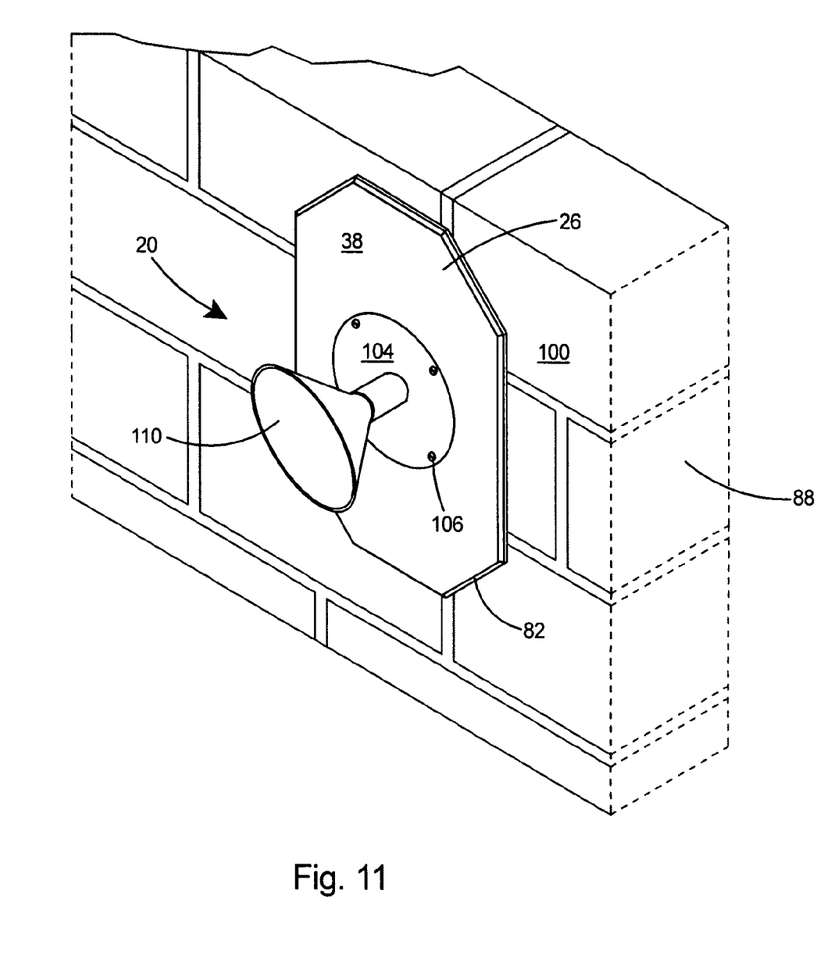
FIG. 11 is a perspective view of the adjustable electrical box assembly of the present invention after being fully installed on a brick wall and with a light fixture mounted thereto and supported by the assembly.

Referring to FIG. 11 there is shown a completed installation of a preferred embodiment of an adjustable electrical box assembly 20 according to the present invention. The faceplate 26 is secured firmly to the electrical box and the electrical box is obscured from view by the faceplate 26. In this particular instance, the electrical box assembly 20 is used to mount a light fixture 110 to the brick wall 88. The adjustable electrical box assembly 20 of the present invention could be used to mount various other electrical fixtures including but not limited to electrical outlets, switches, timers, and photocells.

The measurements of the inner diameter D2 (see FIG. 5) of the collar 30 portion of the flange member 22 and the outer diameter D1 (see FIG. 4) of the sidewalls 32 of the electrical box 24 are critical to the practice of the invention as the electrical box 24 must be large enough to hold electrical wiring but also be telescopically received within the collar 30 of the flange member 22. With the preferred measurements cited hereinabove the clearance between the electrical box sidewalls 32 and the collar 30 of the flange member 22 is preferably between 0.005 and 0.025 inch. This clearance provides a snug fit between the electrical box sidewalls 32 (see FIG. 2) while still enabling the electrical box 24 to be slideable or telescopically received within the collar 30 of the flange member. It is also critical to the practice of the invention that the collar 30 extend from the front surface 62 of the flange 28 by at least distance D3 (see FIG. 6) to provide enough length to the collar 30 so that it adequately supports the electrical box 24 as it is slid therein (see FIG. 2). It is furthermore critical to the practice of the invention that electrical box sidewalls 32 have a length of at least D4 inches (see FIG. 4) to enable the electrical box 24 to extend through substantially all known widths of bricks or stones that are available in the building construction industry. The sidewalls 32 of the electrical box 24 must be capable of extending through the collar 30 of the flange member 22 and all the way to the front face of the widest bricks or stones used in construction.

As described herein above it is usually more challenging to mount an electrical fixture on a brick or stone wall than on siding. This is a consequence of using conventional electrical boxes that are typically designed for use on siding and also a consequence of the various thicknesses of brick or stone used in construction. Unless the brick or stone is extremely narrow, a conventional electrical box will not extend all the way to the substrate and as a result is typically mortared into the opening in the brick or stone wall. The adjustable electrical box assembly of the present invention solves the problems of installing conventional electrical boxes on brick or stone walls by providing an electrical box with substantially long sidewalls than can extend through any thickness of brick or stone. A separate flange member is secured to the substrate and the electrical box is telescopically received within the flange member. The electrical box can be adjusted to the desired depth within the brick or stone wall such as flush or extending outwards slightly from the wall. The installation is completed by installing an electrical fixture within the electrical box, securing a faceplate to the front of the electrical box, and closing the center opening of the faceplate with a conventional cover plate. As compared to the prior art method, the adjustable electrical box of the present invention completely eliminates the user of mortar to secure the electrical fixture to the brick or stone wall.

With reference to FIG. 2, the flange member 22, electrical box 24, and faceplate 26 portions of the adjustable electrical box assembly 20 can each be constructed of metal or plastic. An especially preferred material of construction is plastic, preferably polyvinyl chloride (PVC), polycarbonate, acrylonitrile-butadiene styrene (ABS), or polyethylene. Preferably the flange member 22, electrical box 24, and faceplate 26 are each molded in plastic of one piece.

Having thus described the invention with reference to a preferred embodiment, it is to be understood that the invention is not so limited by the description herein but is defined as follows by the appended claims.

What is claimed is:

1. An adjustable electrical box assembly for mounting electrical components or fixtures on a wall comprising:
   a flange member including a flange and a forward extending collar with an opening therein;
   an electrical box including sidewalls having a front edge, a rear edge, and an inner surface;
   a faceplate including a front panel having an opening therein;
   one or more inward extending bosses extending from said inner surface of said sidewalls of said electrical box;
   said sidewalls of said electrical box telescopically received in and adjustable with respect to said collar of said flange member;
   an anchoring arrangement for securing said flange member to the wall;
   a fastening arrangement for securing said electrical box to said flange member said fastening arrangement including a plurality of slots in said collar, one or more rows of apertures in said sidewalls of said electrical box, and fasteners for insertion through said slots in said collar into said apertures in said sidewalls of said electrical box; and an attachment arrangement for securing said faceplate to said electrical box.

2. The adjustable electrical box assembly of claim 1 wherein said electrical box is substantially tubular shaped.

3. The adjustable electrical box assembly of claim 2 wherein said substantially tubular shaped electrical box includes a circular outer periphery.

4. The adjustable electrical box assembly of claim 1 wherein said anchoring arrangement includes
a plurality of apertures in said flange of said flange member; and
fasteners for securing through said apertures of said flange into the wall.

5. The adjustable electrical box assembly of claim 1 wherein
each of said inward extending bosses includes a front face; and
said front faces of said bosses are recessed a slight distance from said front edge of said electrical box.

6. The adjustable electrical box assembly of claim 1 wherein each of said rows of apertures extend through said sidewalls of said electrical box into one of said inward extending bosses.

7. The adjustable electrical box assembly of claim 6 wherein
said one or more rows of apertures in said sidewalls of said electrical box includes at least two rows of apertures;
each aperture in said rows of apertures is in alignment with a corresponding aperture in each of the other rows; and
each of said corresponding apertures is aligned along a plane bisecting said sidewalls of said electrical box and parallel with said edges of said electrical box.

8. The adjustable electrical box assembly of claim 7 wherein the depth of insertion of said electrical box in said collar of said flange member is adjusted by selecting a set of said corresponding apertures in said sidewalls of said electrical box.

9. The adjustable electrical box assembly of claim 1 wherein said sidewalls of said electrical box include a length of at least 3.5 inches.

10. The adjustable electrical box assembly of claim 1 wherein
said collar of said flange member includes an inner diameter;
said sidewalls of said electrical box include an outer diameter;
said inner diameter of said collar is slightly larger than said outer diameter of said electrical box; and
a fillet extends between said collar and said flange of said flange member.

11. The adjustable electrical box assembly of claim 10 wherein
said outer diameter of said sidewalls of said electrical box is between 3.98 and 3.99 inches;
said inner diameter of said collar of said flange member is between 3.995 and 4.005 inches;
said sidewalls of said electrical box are telescopically received within said collar of said flange member with a clearance between said sidewalls of said electrical box and said collar of said flange member; and said clearance between said electrical box sidewalls and said collar of said flange member is between 0.005 and 0.025 inch.

12. The adjustable electrical box assembly of claim 1 wherein said flange member, said electrical box, and said faceplate are each molded of plastic in one piece.

13. The adjustable electrical box assembly of claim 12 wherein said plastic is selected for the group including polyvinyl chloride, polycarbonate, acrylonitrile-butadiene styrene, and polyethylene.

14. The adjustable electrical box assembly of claim 12 wherein
said flange of said flange member includes a front surface; and
said collar extends from said front surface of said flange by at least 1.26 inches.

15. The adjustable electrical box assembly of claim 1 wherein said front panel of said faceplate includes a chamfered edge.

16. The adjustable electrical box assembly of claim 1 wherein
said electrical box includes four of said inward extending bosses spaced equidistant around the inner periphery of said electrical box;
said collar of said flange member includes four of said slots; and
each of said rows of apertures in said electrical box are in alignment with one of said slots in said flange member when said electrical box is telescopically received in said collar of said flange member.

17. An adjustable electrical box assembly for mounting electrical components or fixtures on a wall comprising:
a flange member including a flange and a forward extending collar with an opening therein;
an electrical box including sidewalls having a front edge, a rear edge, and an inner surface;
a faceplate including a front panel having an opening therein;
one or more inward extending bosses extending from said inner surface of said sidewalls of said electrical box, said bosses extend longitudinally along said inner surface of said sidewalls of said electrical box, and said bosses extend along the entire length of said sidewalls;
said sidewalls of said electrical box telescopically received in and adjustable with respect to said collar of said flange member;
an anchoring arrangement for securing said flange member to the wall;
a fastening arrangement for securing said electrical box to said flange member; and
an attachment arranged for securing said faceplate to said electrical box.

18. An adjustable electrical box assembly for mounting electrical components or fixtures on a wall comprising:
a flange member including a flange and a forward extending collar with an opening therein;
an electrical box including sidewalls having a front edge, a rear edge, and an inner surface;
a faceplate including a front panel having an opening therein;
one or more inward extending bosses extending from said inner surface of said sidewalls of said electrical box, each of said bosses including a front face;
said sidewalls of said electrical box telescopically received in and adjustable with respect to said collar of said flange member;

an anchoring arrangement for securing said flange member to the wall;

a fastening arrangement for securing said electrical box to said flange member; and an attachment arrangement for securing said faceplate to said electrical box, said attachment arrangement including an aperture in said front face of each of said inward extending bosses, arms extending from said front panel of said faceplate into said opening of said faceplate, an aperture in each of said arms, and fasteners for securing through said apertures in said arms of said faceplate into said apertures in said front face of said bosses.

19. The adjustable electrical box assembly of claim 18 wherein said attachment arrangement includes two of said apertures in said front face of each of said inward extending bosses including an inner aperture and an outer aperture; and said inner aperture is closer to the axial center of said electrical box than said outer aperture.

* * * * *